United States Patent [19]
Hyodo

[11] Patent Number: 5,848,427
[45] Date of Patent: Dec. 8, 1998

[54] INFORMATION CHANGING SYSTEM AND METHOD OF SENDING INFORMATION OVER A NETWORK TO AUTOMATICALLY CHANGE INFORMATION OUTPUT ON A USER TERMINAL

[75] Inventor: Yoshii Hyodo, Kawasaki, Japan

[73] Assignee: Fujitsu Limited, Kawasaki, Japan

[21] Appl. No.: 686,643

[22] Filed: Jul. 26, 1996

[30]       Foreign Application Priority Data

Sep. 14, 1995   [JP]   Japan .................................. 7-237084

[51] Int. Cl.⁶ ....................................................... G06F 17/30
[52] U.S. Cl. ...................... 707/513; 707/505; 395/200.48
[58] Field of Search ................................. 707/501, 513, 707/104, 505, 506, 507, 508; 395/200.48, 200.32, 200.33; 345/335

[56]               References Cited

U.S. PATENT DOCUMENTS

| | | | |
|---|---|---|---|
| 5,297,249 | 3/1994 | Bernstein et al. | 707/501 |
| 5,367,621 | 11/1994 | Cohen et al. | 707/501 |
| 5,491,820 | 2/1996 | Belove et al. | 707/3 |
| 5,530,852 | 6/1996 | Meske, Jr. et al. | 395/200.36 |
| 5,572,643 | 11/1996 | Judson | 395/200.48 |
| 5,710,918 | 1/1998 | Lagarde et al. | 395/200.48 X |
| 5,721,908 | 2/1998 | Lagarde et al. | 395/200.32 X |
| 5,734,831 | 3/1998 | Sanders | 395/200.53 |
| 5,748,188 | 5/1998 | Hu et al. | 395/200.48 X |
| 5,751,956 | 5/1998 | Kirsch | 395/200.33 |
| 5,752,246 | 5/1998 | Rogers et al. | 707/104 X |

OTHER PUBLICATIONS

McCool, "What's wrong with HTTPD? (NCSA HTTPD for UNIX 1.3 Internet/Web server software)", Datamation, v42 n7 p94 (2), Apr. 1996.

Christian, "The Unix Operating System," John Wiley & Sons, pp. 232–233, 1983.

*Primary Examiner*—Joseph H. Feild
*Attorney, Agent, or Firm*—Staas & Halsey

[57]               ABSTRACT

Trigger information that specifies locations where HTML text is to be changed is held in a WWW Server. Shell script that changes the HTML text is started up at fixed time intervals and rewrites the file names on the line after the trigger that specifies information such as the home page background image, the in-line image, text and audio information. In this way, the home page can be changed efficiently and flexibly at fixed time intervals.

15 Claims, 9 Drawing Sheets

```
HOME PAGE
<IMG SRC="/cgi-bin/img.pl">
```

INFORMATION CHANGING SYSTEM AND METHOD OF SENDING INFORMATION OVER A NETWORK TO AUTOMATICALLY CHANGE INFORMATION OUTPUT ON A USER TERMINAL

BACKGROUND OF THE INVENTION

1. Field of the Invention

This invention relates to an information changing system and its method that uses an information processing system to send information out on a network and automatically change graphics, text, audio, etc. that are output on a user terminal that has taken in that information.

2. Description of the Related Art

As the number of users of the Internet have increased in recent years, there is also a trend for the number of users who are setting up home pages on the WWW (World Wide Web) to increase. A home page is a screen that is initially displayed when a user accesses a WWW Server from a terminal such as a personal computer; some contain only text, while others include graphics and/or audio. A home page is created by an information provider who sends information out onto the Internet.

One of the factors why users access an information provider's Server on the Internet is that the Server has home pages that are designed to attract the attention of a large number of users. For example, if the contents of a home page are constantly being changed, users will be attracted to that home page. There already exists a CGI (Common Gateway Interface) which an information provider can use to constantly change the content of a home page by giving instructions to change the in-line image data. An in-line image is an image pasted on part of a screen that also contains text.

Figure 1:
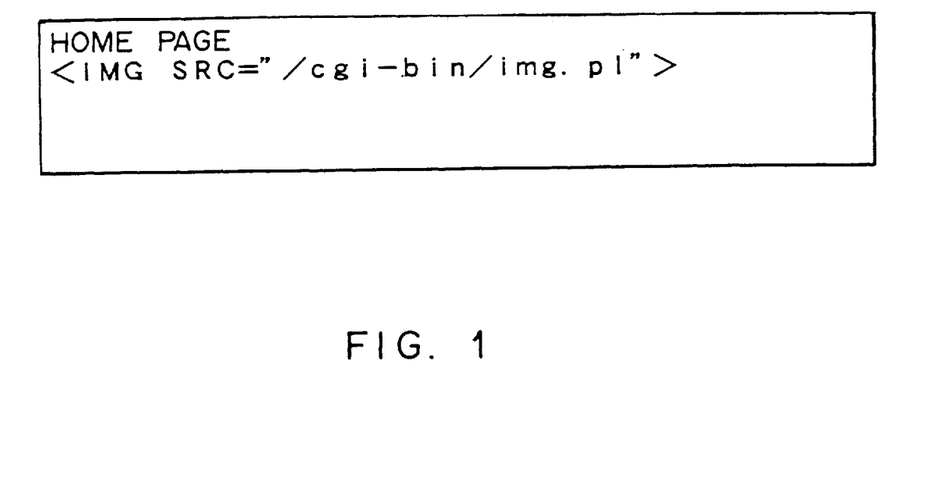
FIG. 1 is a diagram showing an example of a home page CGI.

FIG. 1 shows an example of an instruction given to a CGI to change the content of a home page. In FIG. 1, the home-page in-line image datum IMG SRC is given to the CGI as an instruction under the file name "/cgi-bin/img.pl". This instruction causes the CGI to perform image selection processing such as that shown in FIG. 2, thus changing the in-line image data.

Figure 2:
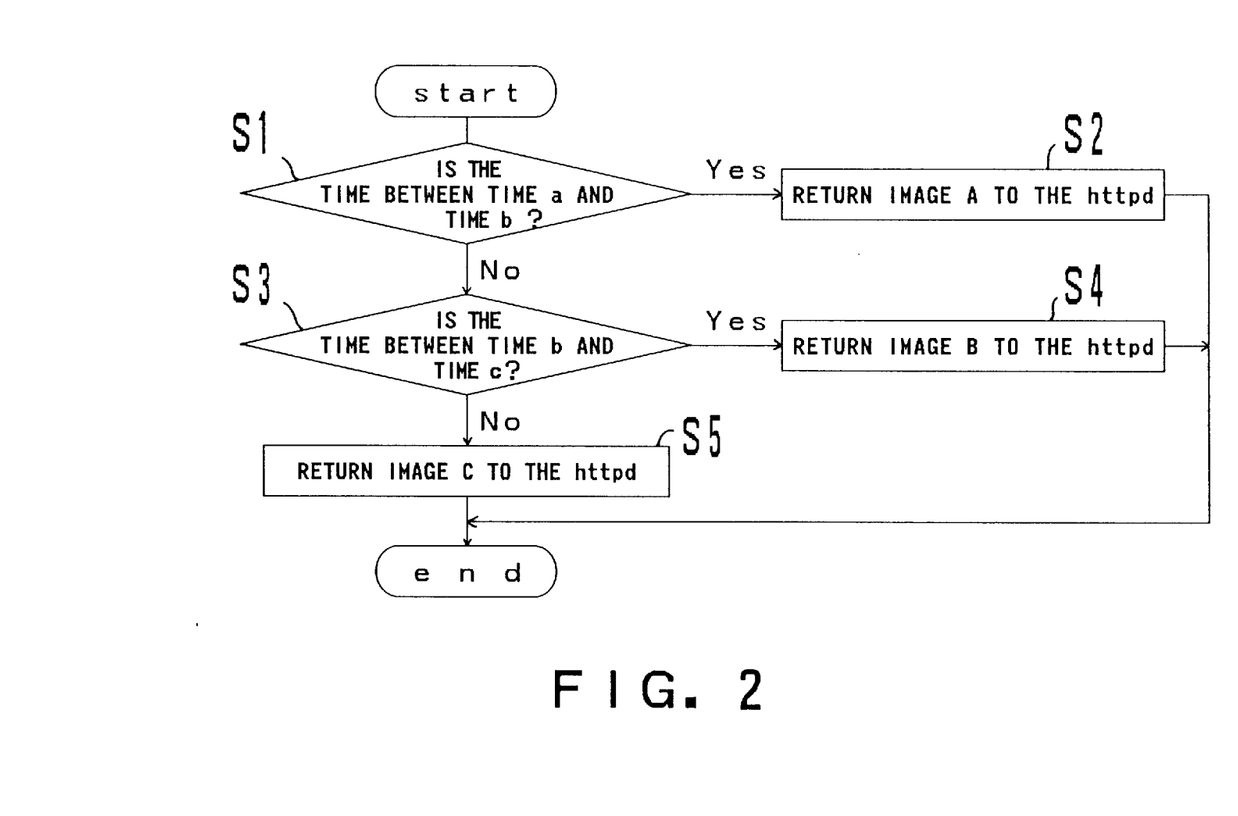
FIG. 2 is a flow chart of existing image selection processing.

When the processing shown in FIG. 2 is started, the CGI process first judges whether or not the present time is between time a and time b (Step S1). If the time is between time a and time b, image A is returned to the httpd (hyper text transfer protocol daemon), and the processing ends.

The httpd is a process that processes information given as an HTML (Hyper Text Markup Language) file on the WWW Server; the image data returned from the CGI process are transferred to the Client terminal as home page in-line image data. All data files including audio, graphics, motion pictures and text are mutually linked in the WWW Server in the HTML format.

If the present time is found to not be between time a and time b in Step S1, it is next judged whether or not the present time is between time b and time c (Step S3). If the time is between time b and time c, then image B is returned to the httpd (Step S4), and the processing ends. If the time is not between time b and time c, then image C is returned to the httpd (Step S5), and the processing ends. In this way, the in-line image is changed from image A to image B and then image C as time progresses.

However, the existing method of changing a home page as described above has the following problem.

In the existing method of change by means of the CGI, only the parts of image data that are pasted onto the home page can be changed. In order to change the whole screen including the background, it is necessary to overwrite the whole screen, and other in-line images are blotted out.

Figure 3:
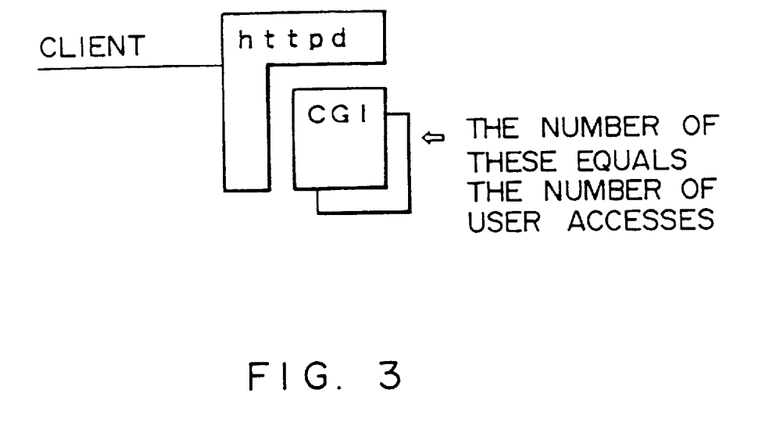
FIG. 3 is a schematic diagram showing processing inside a Server.

In addition, one CGI process is started from the httpd every time image data are taken in by one user, as the number of users who access the Server increases, many CGI processes are started, as shown in FIG. 3. For this reason, there is the problem that the burden on the Server is increased.

In addition, all that can be changed by this method is the image data; other types of data such as text data cannot be changed.

Another method is for the image provider himself to constantly keep changing the home page by hand, but this takes a great deal of time.

SUMMARY OF THE INVENTION

This invention is for the purpose of providing an information changing system and its method that will make it possible to efficiently and flexibly change output information on a terminal that has been accessed in an information processing system that sends information out onto a network on-line.

The information changing system in the present invention has a storage section, a transfer section, a change section and a startup section.

The storage section consists of a plurality of files that are mutually linked, in which are stored output information for return to a user who accesses the system, and specification information that specifies a file included in that output information. This output information is configured in, for example, hyper text format; in general it includes a variety of data such as text data, image data and audio data files. In addition, the specification information that specifies these files uses, for example, the file identifier and file name of the output information that is specified, and can specify a combination of a plurality of files.

The transfer section transfers file data specified by the specification information to the user terminal via the network.

The change section automatically changes the specified information that is stored in the storage section. The action of this change section, which is independent of the action of the transfer section, is, for example, described in shell script and changes the specification information from the present specification to another specification.

The startup section starts the change section at fixed time intervals to change the specification information.

When this invention is used to change, for example, background image data, first the startup section starts the change section. The change section that has been started then rewrites the specification information that specifies the background image data file in the storage section. This rewriting is done at regular intervals, so the background image data are changed at regular intervals and then sent to the user.

Thus, according to this invention, the output on the user's terminal can be changed easily and many different changes can be made.

DESCRIPTION OF THE PREFERRED EMBODIMENT

Figure 4:
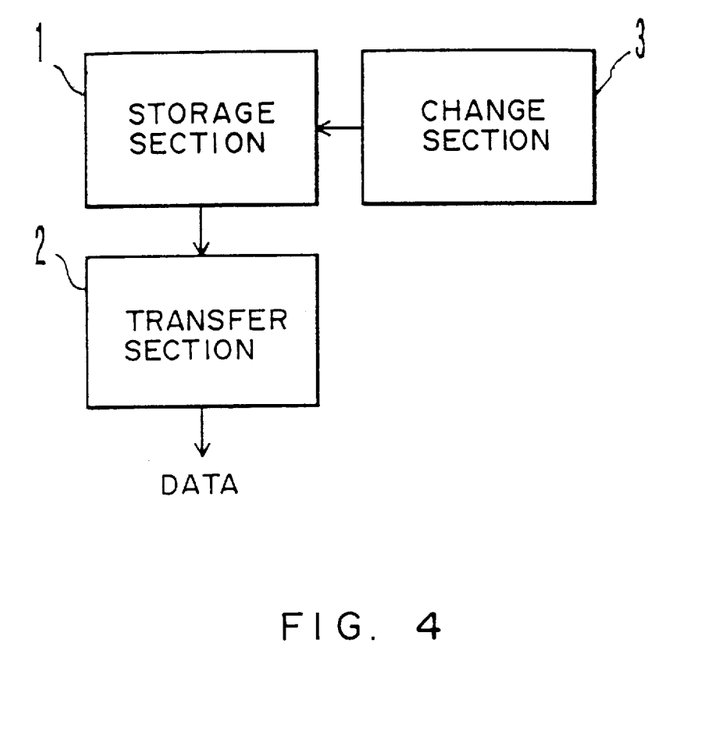
FIG. 4 is a block diagram showing the principle of the present invention.

FIG. 4 shows the principle of the system of this invention. The information changing system in FIG. 4 is realized in an information processing system that is connected to a network, and has a storage section 1, a transfer section 2 and a change section 3.

The storage section 1 consists of a plurality of files that are mutually linked and that store the output information that is for return to a user who accesses the system, and specification information that specifies files that are included in that output information.

The transfer section 2 transfers data of the files specified by the specification information to a user terminal via the network.

The change section 3 automatically changes the specification information that is stored in the storage section 1.

Output information stored in the storage section 1 is configured in, for example, hyper text format, and in general includes a variety of data files such as image data, text data and audio data. As specification information that specifies these output data files, for example HTML text, which specifies the identifier or file name of each data file, is used. The change section 3 automatically changes, for example, the file names included in the specification information to different file names; the transfer section 2 transfers the file data specified by the changed specification information to the user terminal. In this way, different information is output to the user terminal, for example every time there is access from a user.

If HTML text is used, it is possible to combine all of the output data that make up one screen; by providing the change section 3 that changes the contents of those data, the output information can be changed easily and flexibly.

In addition, by making the change section 3 independent of the transfer section 2 that performs the transfer processing for the data accessed by the user, the change processing can be performed without distinguishing among a plurality of users who access those data, reducing the burden on the information processing system. In order to realize such change section 3, it is sufficient to, for example, create shell script that changes the file names in the HTML text, and operate this change system independently of the httpd.

Figure 5:
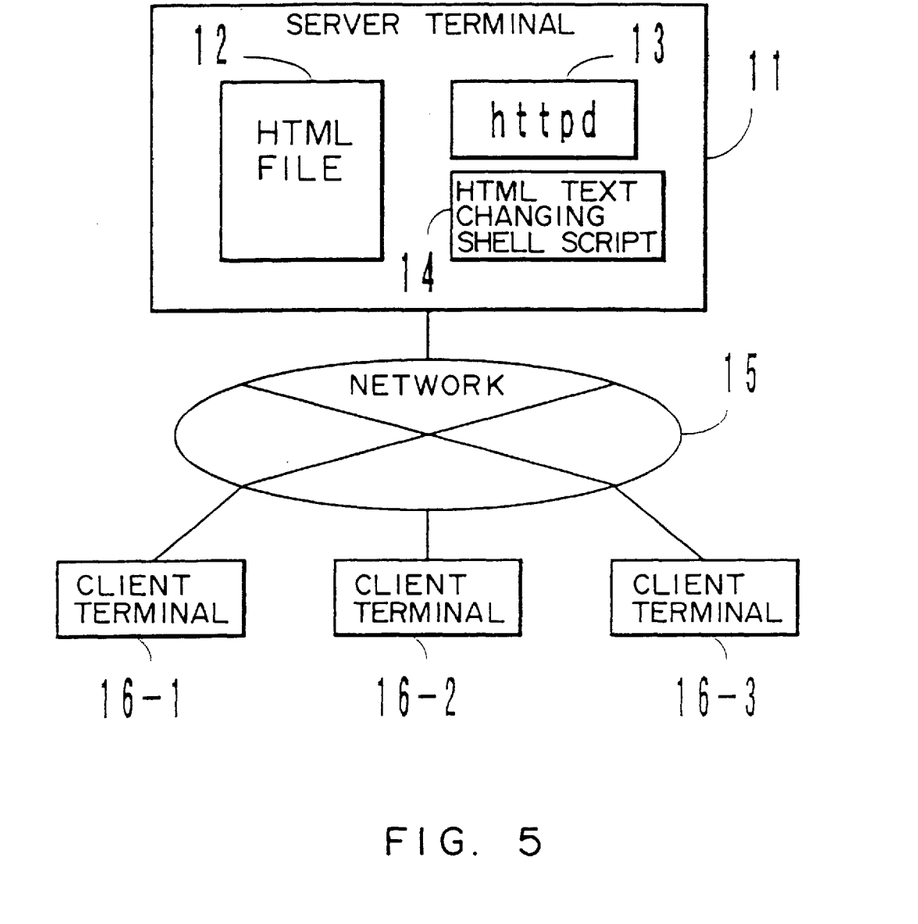
FIG. 5 is a schematic diagram showing the system configuration of an embodiment of the present invention.

The storage section 1 in FIG. 4 corresponds to, for example, the memory of the Server terminal 11 in FIG. 5; the transfer section 2 and the change section 3 correspond to the CPU (Central Processing Unit) inside the Server terminal 11 that operates the httpd 13 and the HTML text changing shell script 14.

An embodiment of this invention will now be described in detail, referring to the drawings.

FIG. 5 shows the system configuration of an embodiment of this invention. In FIG. 5, a network 15 is connected to the WWW Server terminal 11 and the Client terminals 16-1, 16-2 and 16-3. Information processing units such as personal computers and workstations are used as these terminal units. Arbitrary terminal units that are connected to the network 15 can be used as the Server terminal 11 or the Client terminals 16-1, 16-2 and 16-3.

The home page HTML file 12 and the HTML text changing shell script 14 are stored in the memory inside the Server terminal 11, while the httpd 13 is started up on the CPU. The httpd 13 transfers the data in the HTML file 12 to the Client terminal that has accessed the system via the network 15. The shell expressed by the shell script 14 is started up by a timer process that performs processing at fixed time intervals, such as cron, and changes the contents of the HTML file 12. In this way, data such as graphics that are transferred to the Client terminal are automatically changed. This shell script 14 is created in advance by the provider of the home page; crontab (the cron waiting time) is set at the same time.

Figure 6:
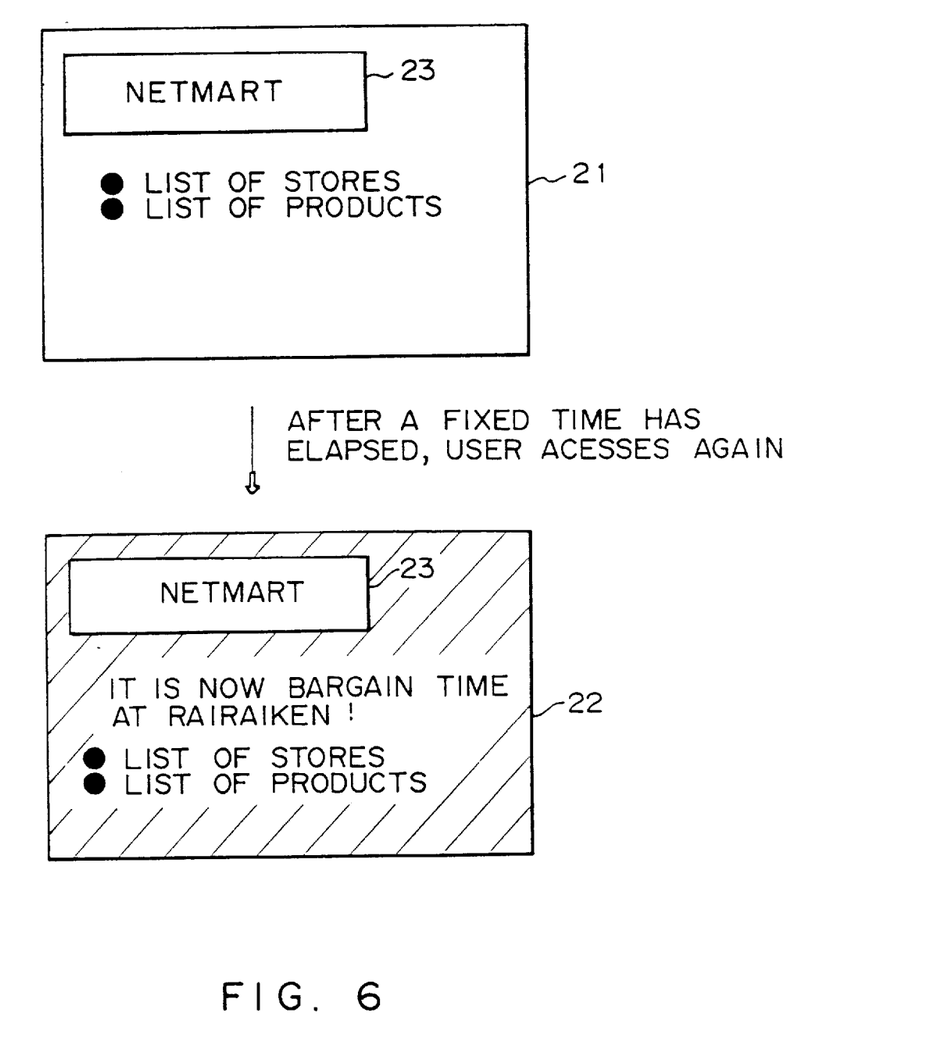
FIG. 6 is a diagram showing an example of a home page display.

FIG. 6 shows an example of a home page display on a Client terminal shown in FIG. 5. The in-line image 23 "NETMART", which is the name of the site provided by the Server terminal 11, and the text information "List of stores" and "List of products" are shown on the display screen 21 in FIG. 6. After a fixed time interval has elapsed, the next time the user accesses this site the NETMART home page will have changed as shown on the display screen 22. On the display screen 22, the background color has changed, and in addition the text information "It is now bargain time at Rairaiken." has been added.

In this way, by means of a timer starting the shell at fixed time intervals and the contents of the shell at fixed time intervals and the contents of the HTML file 12 being automatically edited, the home page display screen and the output audio can be changed. At this time, if the shell script 14 that changes the file names representing the background screen, in-line image, display text and/or audio data in the HTML file 12 is created in advance, the corresponding output information will be changed automatically.

Figure 7:
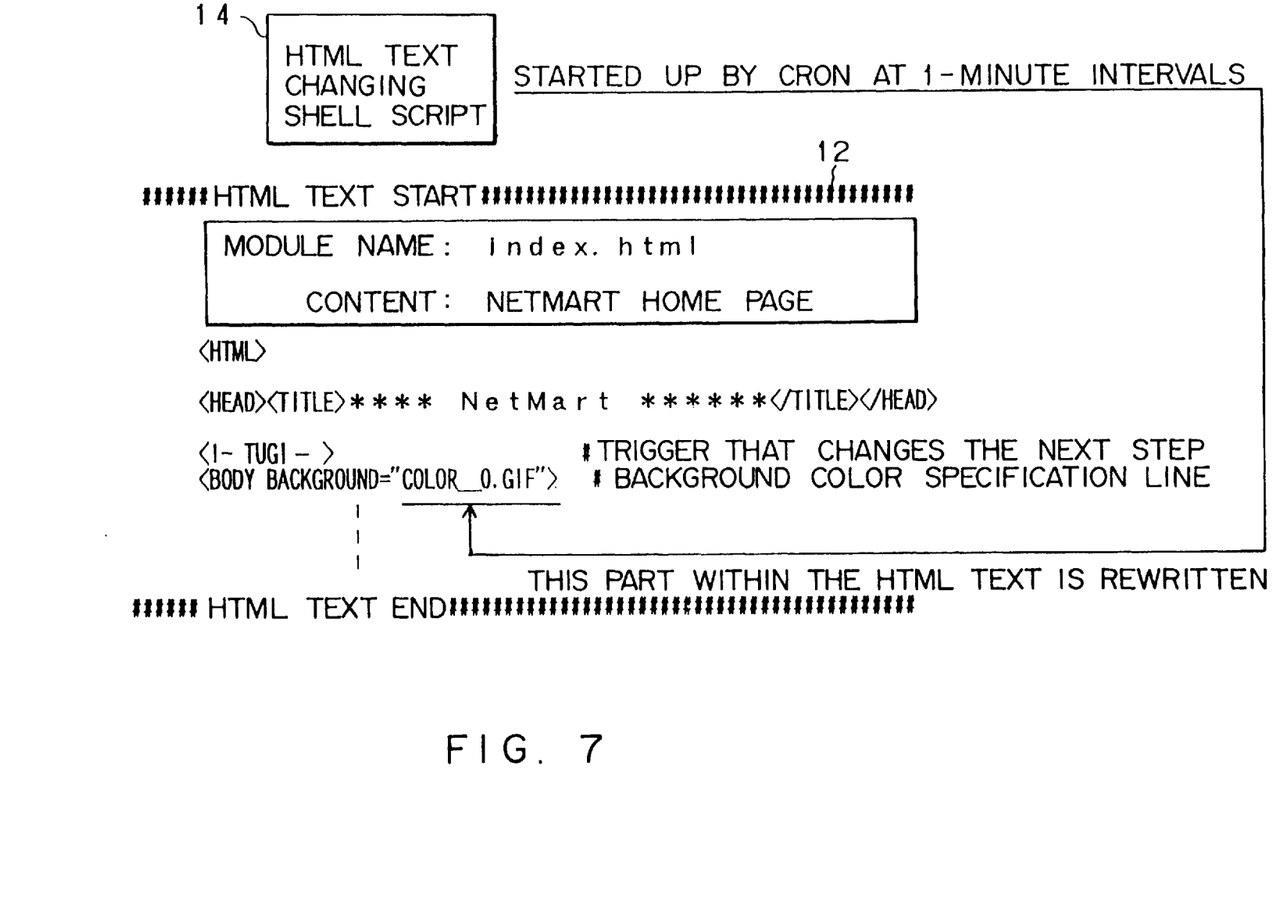
FIG. 7 is a diagram showing an example of an HTML file.

FIG. 7 shows an example of an HTML file 12. The HTML file in FIG. 7 contains the NETMART home page HTML text; the parts enclosed by <HEAD> <TITLE> and </TITLE> </HEAD> correspond to the character data that express the home page title. In addition, <!-TUGI-> is a description that is the trigger for changing of the next step (line). That next line, <BODY BACKGROUND= "COLOR_0.GIF">, specifies the background image data file name; the home page background color can be changed by changing this part.

Suppose, for example, that as the background image data files the following 10 GIF files have been prepared:

| | | | |
|---|---|---|---|
| COLOR_0.GIF | COLOR_1.GIF | COLOR_2.GIF | COLOR_3.GIF |
| COLOR_4.GIF | COLOR_5.GIF | COLOR_6.GIF | COLOR_7.GIF |
| COLOR_8.GIF | COLOR_9.GIF | | |

Then, as shown in FIG. 7, if the shell script 14 is started up and the name of the file that specifies the BODY BACKGROUND is rewritten at 1 minute intervals, these 10 files can be rotated at 1 minute intervals. As a result, the home page background image is rotated at 1 minute intervals, returning to the first image after 10 minutes.

Figure 8:
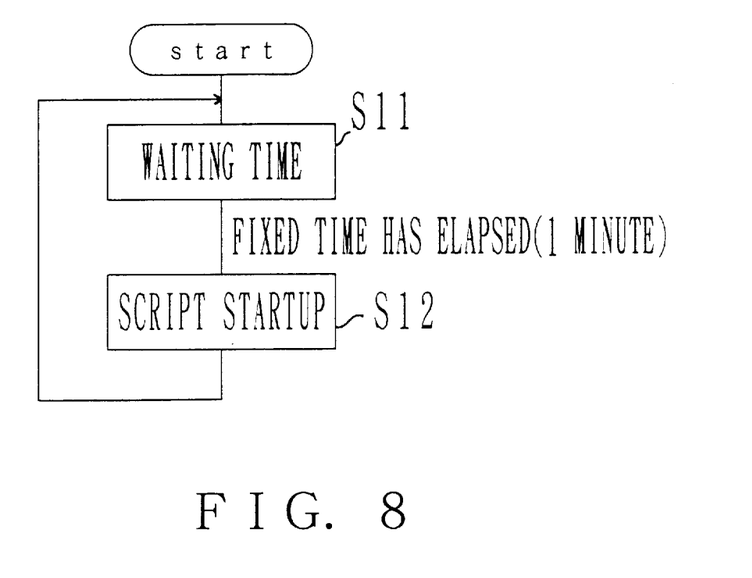
FIG. 8 is a flow chart of shell script startup processing.

Next, referring to FIG. 8 and FIG. 9, will be explained the flow of processing to change the screen display. FIG. 8 is a flow chart of the shell script startup processing by cron. When the processing in FIG. 8 starts, cron waits until the fixed time interval set by crontab has elapsed (Step S11), then the shell script 14 is started up (Step S12). Then the processing in steps S11 and S12 is repeated. For example, if the waiting time set by crontab is 1 minute, every time 1 minute elapses the shell script 14 is started up.

Figure 9:
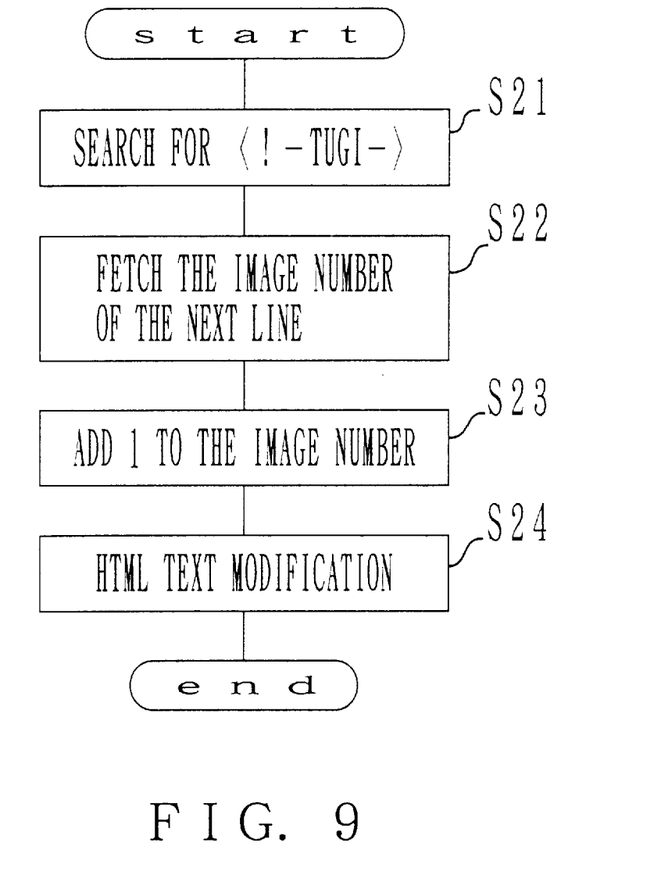
FIG. 9 is a flow chart of image change processing.

FIG. 9 is a flow chart of the image change processing by the shell script 14. When the shell script 14 is started up in FIG. 9, first the system searches for the line on which <!-TUGI->, which is a trigger that indicates the location where a change is to be made, appears in the HTML file 12 (Step S21), then the image number of the file name which appears on the subsequent line is fetched (Step S22). In the case shown in FIG. 7, the 0 in "COLOR_0.GIF" corresponds to the image number.

Next, 1 is added to the fetched image number (Step S23), the HTML text is modified using that number (Step S24), and the processing ends. Thus, the file name COLOR_0.GIF is changed to COLOR_1.GIF. Note that if 1 is added to the image number 9 in Step S23, the result is 0.

In the HTML text in FIG. 7, if the in-line image, display text, or audio specification file name (not shown in the figure) are changed instead of the background image file name, then the corresponding information is changed at regular intervals, in the same as the background image in the example described above.

In this embodiment, the shell script acts without being synchronized with the httpd that processes requests from Client terminals, so the burden that the Server terminal imposes on the system is relatively small.

It is of course also possible to set, for example, a plurality of triggers in an HTML file, or to give the system the capability of specifying a plurality of lines in a trigger, so that the trigger will simultaneously change a plurality of parts of the information according to the shell script 14, and thus, for example, simultaneously change the background color and the displayed text.

Not only the in-line image, but also the background image, display text and audio can be changed; switching information can be easily added or changed. For example, if a file containing a list of names of files containing switching information is created, and file names are added to or deleted from it, the information displayed on the screen can be dynamically added to or changed.

Further, the switching time can be easily and dynamically changed by changing the entries to crontab and restarting cron.

In the embodiment described above, we have mainly described a system in which a WWW Server home page screen is changed, but this invention is not limited to this particular case; it is possible to change any arbitrary output information that is described in HTML. In addition, the shell script can be started up not only at fixed intervals, but according to other trigger conditions.

According to this invention, in an information processing system that sends a variety of information out on a network such as the Internet, it is possible to change the output on the terminal of a user who accesses this information easily and in a variety of ways.

What is claimed is:

1. An information changing system equipped with an information processing system is connected to a network for providing a variety of information on-line in response to an access from a user, comprising:

storage means for storing output information that includes a plurality of mutually linked files and is returned to users who access the information processing system, and specification information that specifies a file included in said output information;

transfer means for transferring data in the file specified by said specification information to user terminals via said network; and change means for automatically changing said specification information stored in said storage means, wherein said change means acts independently of said transfer means by means of a shell script.

2. The information changing system according to claim 1, wherein said storage means stores said output information configured in hyper text format and said specification information that gives the file names of files included in said output information.

3. The information changing system according to claim 1, wherein the action of said change means is described by the shell script that rewrites said specification information from the present specification to another specification.

4. The information changing system according to claim 1, further comprising a startup means for starting up said change means at fixed time intervals in order to change the said specification information.

5. The information changing system according to claim 1, wherein said storage means stores said output information including a file of image data displayed on said user terminal screen, and said change means changes said specification information that specifies said file of image data.

6. The information changing system according to claim 5, wherein said storage means stores said output information including a file of background image data to be displayed on said user terminal screen, and said change means changes the said specification information that specifies said file of background image data.

7. The information changing system according to claim 6, wherein said storage means stores a plurality of files of background image data corresponding to a plurality of background colors and said changing means switches the file of background image data included in said output information to another file of background image data by changing said specification information.

8. The information changing system according to claim 1, wherein said storage means stores said output information including a text data file, to be displayed on said user terminal screen, and said change means changes said specification information that specifies said text data file.

9. The information changing system according to claim 1, wherein said storage means stores said output information including a file of audio data output to said user terminal and said change means changes said specification information that specifies said file of audio data.

10. The information changing system according to claim 1, wherein said specification information stored in said storage means specifies one or a plurality of files among the files included in said output information.

11. The information changing system according to claim 10, wherein said change means changes at least one of the specifications of one or a plurality of files among said specification information.

12. A computer-readable storage medium used to direct a computer connected to a network, providing a variety of information on-line in response to an access from a user, to perform the functions of:

transferring data of a file specified by specification information, among the output information that consists of a plurality of mutually linked files returned to users who have accessed the system, and changing said specification information automatically, wherein the changing function acts independently of the transferring function by means of a shell script.

13. The computer-readable storage medium according to claim 12, further directing the computer to perform the function of:

changing said specification information at fixed time intervals.

14. A changing information method for providing a variety of information on-line, using an information processing system that is connected to a network, comprising steps of:

storing output information that includes a plurality of mutually linked files and is returned to users who have accessed the system, and storing specification information that specifies a file included in said output information;

automatically changing said specification information by means of a shell script; and transferring data of a file specified by the changed specification information to user terminals via the said network, wherein the step of changing said specification information is processed independently of the step of transferring data of said file specified by the changed specification information.

15. The changing information method according to claim 14, wherein said specification information is changed at fixed time intervals.

* * * * *